United States Patent [19]

Stengle, Jr.

[11] 4,342,803
[45] Aug. 3, 1982

[54] HEAT-RESISTANT VACUUM PAD AND METHOD OF MAKING SAME

[75] Inventor: Edward J. Stengle, Jr., Toledo, Ohio

[73] Assignee: Owens-Illinois, Inc., Toledo, Ohio

[21] Appl. No.: 196,419

[22] Filed: Oct. 14, 1980

[51] Int. Cl.³ .................... B32B 17/04; B32B 5/16
[52] U.S. Cl. ............................... 428/131; 428/64; 428/65; 428/137; 428/244; 428/251; 428/266; 428/268; 428/323; 428/401; 428/429; 428/447
[58] Field of Search ............... 428/244, 902, 266, 268, 428/251, 429, 447, 401, 323, 408, 131, 137, 64, 65

[56] References Cited

U.S. PATENT DOCUMENTS

| | | | |
|---|---|---|---|
| 3,006,403 | 10/1981 | Cooper | 428/429 |
| 3,889,023 | 6/1975 | Pluddemann | 428/429 |
| 3,953,641 | 4/1976 | Marquis | 428/902 |
| 4,059,473 | 11/1977 | Okami | 428/429 |
| 4,110,095 | 8/1978 | Stengle | 428/266 |
| 4,246,313 | 1/1981 | Stengle | 428/266 |
| 4,316,930 | 2/1982 | Stengle | |

OTHER PUBLICATIONS

"Glass Fibers", R. F. Caroselli, *Man Made Fibers*, vol. 3, H. F. Mark, Editor, 1968, p. 434.

*Primary Examiner*—Ellis P. Robinson
*Attorney, Agent, or Firm*—E. J. Holler; M. E. Click; D. H. Wilson

[57] ABSTRACT

This invention relates to a laminated vacuum pad, and method of making same, comprising a heat-resistant woven fabric substrate having a continuous heat and wear-resistant continuous coating thereon for handling hot glass articles, and the like, without marring same. The heat-resistant flexible vacuum pad is formed from a tightly woven fabric such as glass fibers with a continuous imperforate coating of organic-inorganic silicone resin containing a filler of heat-resistant carbonaceous material adapted to withstanding extensive repeated contact with newly-formed hot glass articles. The flexible laminated vacuum pad is preferably used as a facing material for a rigid structural member formed of metal.

7 Claims, 3 Drawing Figures

HEAT-RESISTANT VACUUM PAD AND METHOD OF MAKING SAME

CROSS-REFERENCE TO RELATED APPLICATIONS

A related U.S. patent application is entitled, "Improvements in the Manufacture of Glass Wherein Hot Metal Molds are Provided With a Solid Film Lubricant Layer", Ser. No. 562,554, filed Mar. 27, 1975, and refiled as Ser. No. 727,322, filed Sept. 27, 1976, the latter issued as U.S. Pat. No. 4,110,095 on Aug. 29, 1978, in the name of the same applicant and assigned to the same common assignee as the present application.

Another related U.S. patent application is entitled, "Heat Resistant Composite Material and Method of Making Same", Ser. No. 002,831, filed Jan. 12, 1979, in the name of the same applicant and assigned to the same common assignee as the present application.

BACKGROUND OF THE INVENTION

1. Field of the Invention

This invention generally relates to flexible composite materials which are extremely heat-resistant, and methods of making same, which materials have a continuous layer or coating of solid film lubricant or glass release agent which essentially comprises an organic/inorganic silicone resin having a finely-ground particulate filler therein. The layer or coating is formed by taking an organopolysiloxane resin or mixture of such resins in a solvent, and dispersing a prescribed amount of finely-ground graphite-containing material therein, the combined materials being applied to and heat cured on a woven fibrous substrate comprised of a heat-resistant material such as glass fibers, or similar high-temperature resistant substrates. The selected substrate after coating may be severed into precisely-sized and shaped contours prior to or subsequent to heat-curing the resin containing the filler material.

The composite material may be fabricated into vacuum pads, tong liners, and the like, for handling newly-formed, hot glass articles without marring their surfaces or creating objectionable emissions from the composite material due to excessive heat. The coating cures into a thermoset hardened condition fully dispersed through the fabric substrate, and is then flexed to permit the substrate to retain an appreciable degree of flexibility. Normally, the fibrous substrate, while possessing an appreciable amount of heat resistance, cannot be employed alone without a suitable heat-resistant coating for long-term, repeated handling of hot glass articles.

2. Description of the Prior Art

It has been common practice in the glass forming art to fabricate or cover conveyor belting and hot glass transfer mechanisms for transporting hot glass articles with asbestos or asbestos-containing materials such as transite to provide heat-resistant surfaces which would not mar the glass and provide long-term operating life. Also, bucket liners and sweep arm fingers have previously been fabricated with coverings of asbestos cloth for handling hot glass articles. It is desirable to eliminate the use of all asbestos in such operations.

In the production of glassware, certain handling equipment has also been coated with graphite and petroleum oil swabbing compositions to provide lubricity and heat-resistance. In the use of such coatings, when the petroleum fraction flashes off, it can detract from effective lubrication during forming and emit undesirable emissions into the atmosphere.

The use of water-based carriers instead of the petroleum oil carriers for graphite and other lubricous materials have not been entirely satisfactory, primarily due to the high heat of vaporization of water and the resulting excessive cooling of the glass-handling equipment. In addition, it is difficult to controllably wet the handling equipment surfaces with water-based materials which are applied intermittently during production of glassware.

High temperature fabrics based on inorganic fibers such as glass, silica, quartz, and ceramics, have been proposed as replacement materials for asbestos for handling hot glass articles up to 1000° F. (538° C.). In glass manufacturing operations, such fabrics do not normally stand up well in repeated contact with hot glass articles because of their low resistance to abrasion. In the manufacture of glass fiber, for example, chemical treatments (sizings) such as acrylic resin or starch are used to reduce abrasive contact and fiber breakage during processing. These are organic and burn off in a high temperature environment such as in handling hot glass articles resulting in surface abrasion at the product/fabric interface and also within the fabric. Fabrics based on inorganic fibers exhibit the necessary heat resistance for hot glass handling; however, such materials require a combination with high temperature solid lubricant coating technology to be functional. This has been accomplished by this invention and coated glass fabrics have been developed which exhibit an acceptable service life in handling hot glass articles such as by conveyor ware transfer mechanisms.

SUMMARY OF THE INVENTION

The present invention comprises a vacuum pad having a unique combination of materials including a cured, thermoset, organopolysiloxane resin containing a filler of heat-resistant particulate material which is applied over a tightly-woven, thick fabric comprised of thin glass fibers. The invention relates to generally flexible composite materials which are extremely heat-resistant, and methods of making same, which materials have at least one continuous layer or coating of solid film lubricant or glass release agent which essentially comprises an organopolysiloxane resin having a finely-ground, graphite-containing particulate filler therein. The combined coating constituents are applied over a woven fibrous substrate comprised of glass fibers, and the like, and heat-cured thereon. The substrate may be preliminarily severed into precisely-sized and shaped contours prior to applying the coating and heat-curing the resin containing the filler material for its use as a covering over another rigid surface. The layer or coating composition is formed of a solid film lubricant which essentially comprises a finely-divided, heat-resistant filler dispersed in a silicone resin-cured, alcohol solution. The layer or coating is formed by introducing the dispersion of a fine graphite-containing filler into an organic solution of a further-curable, thermosettable, organopolysiloxane resin which is applied over the woven glass fiber cloth substrate and then the organopolysiloxane resin is cured into a thermoset hardened condition.

Accordingly, an object of the present invention is to provide an improved hot glass handling, laminated vacuum pad material.

Another object of the present invention is to provide a composite material which provides long-term effectiveness in repeated contact with newly-formed hot glass articles in the form of a laminated vacuum pad.

Another object of the present invention is to provide improved hot glass handling capability to existing vacuum takeout devices, and the like, by providing a flexible heat-resistant fibrous vacuum pad with a continuous graphite-filled organopolysiloxane resin coating thereon adapted to cover the glass contacting surfaces of such equipment.

Yet another object of the present invention is to provide a method of making a high heat-resistant vacuum pad which is capable of repeated contact with hot glass articles over an extensive period without deterioration of the material or deleterious marking of the glass articles.

Still another object of the present invention is to provide a heat and wear-resistant woven fabric substrate having a continuous coating of silicone resin and finely-divided graphite-type filler thereon in cured thermoset hardened condition adapted to long-term serial handling of newly-formed hot glass articles.

These and other objects and features of the present invention will become apparent from the following detailed description.

DETAILED DESCRIPTION OF THE PREFERRED EMBODIMENT

Figure 1:
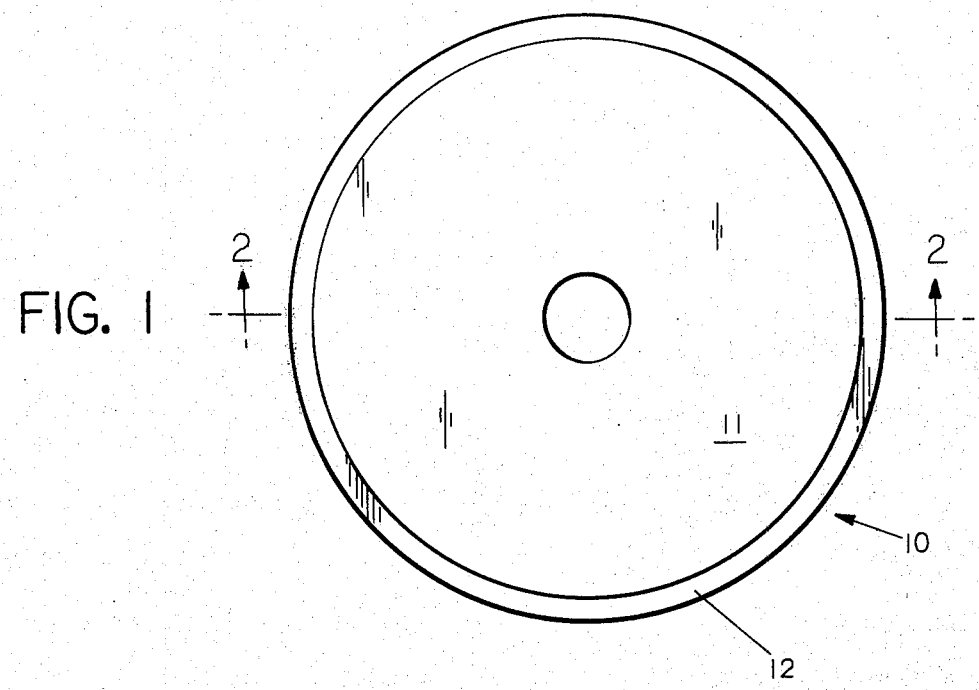
FIG. 1 is a plan view of a circular, laminated vacuum pad for handling hot glass articles.
Figure 2:
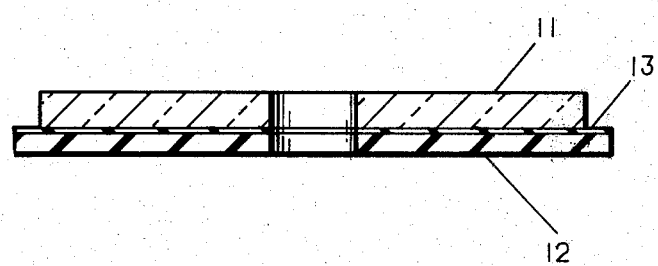
FIG. 2 is a vertical sectional view taken along the line 2—2 of FIG. 1.
Figure 3:
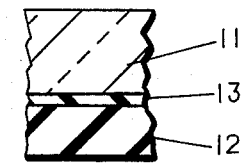
FIG. 3 is an enlarged vertical sectional view of the vacuum pad shown in FIG. 2.

The base material upon which the combined layer or coating composition is applied is preferably comprised of glass fiber cloth, such as commonly manufactured and sold under the trademark, "Textoglass", by the J. P. Stevens & Co., Inc., Industrial Fabrics Dept., New York, N.Y. Such glass fiber cloth is commonly fabricated into a variety of special industrial products exhibiting high modulus of rupture. Among the more significant characteristics of glass fibers are high tensile strength, resistance to combustion and flame retardancy, resistance to stretch, and good surface abrasion resistance. The material is useful over a wide range of temperatures without deterioration or degradation and has a thermal conductivity generally similar to asbestos fibers.

A preferred form of the material is J. P. Stevens Style No. 1906, Finish No. 9383, which is a twill weave. This material is made from 0.00018 inch diameter glass fibers, has a weight of 26.5 ounces per square yard, and a thickness of 0.045 inch. The minimum average breaking strength in pounds per inch of width is 430 warp and 230 fill. The material can be employed to weave thick fibrous cloth which may be used as conveyor belts, vacuum pads, and insulating cloth or pads. The material possesses very good thermal resistance, as well as excellent chemical resistance to most common chemicals. Glass fabric based on a "C" filament having 0.00018 inch diameter is preferred for reasons of this diameter being safer from the standpoint of skin sensitivity problems.

The glass fibers can be woven into tightly, interwoven cloth having a thickness of less than about ¼ inch. Various thicknesses of the glass fiber fabric can be employed as the substrate. Other materials can be employed as the substrate so long as they possess high temperature resistance to degradation and can be fabricated into interwoven fibrous cloth. Among such other materials which may be used as the flexible substrate are ceramic fiber cloth, such as manufactured by the Carborundum Company, and carbon cloth manufactured by American Kynol, Inc., all of which are comprised of high-temperature resistant fibers or yarn adapted to be fabricated into cloth.

The carbon cloth is essentially a phenolic fiber, known as carbonized Kynol, or Kynol novoloid precurser fiber, which is formed by formaldehyde curing of melt-spun novolac resin. Curing results in the formation of methylol groups, dimethyl ether bonds, and methylene bonds, and because of its three dimensionally crosslined structure, the fiber thus obtained is infusible. The fiber is capable of being carbonized directly, without the need for intermediate infusibility treatment.

The ceramic fiber cloth may be comprised of Fiberfrax ceramic fiber which in textile form contains 15 to 25% organic fiber added during the carding process to produce roving. Such textiles have superior insulating ability to 2300° F. (1260° C.), and excellent resistance to thermal shock, corrosive attack, and breakdown due to mechanical fibration and stress. They are available from the Carborundum Company. The materials can be double woven to provide exceptional strength and be heat-treated to remove all organics.

The glass fiber cloth is easily able to withstand temperatures as high as 1200° F. (650° C.). Such material in fabric form is able to maintain high tensile strength while resisting thermal shock and abrasion. Such fibers are composed of borosilicate glass and offer much better dimensional stability than amorphous silica fibers.

EXAMPLE NO. I

A preferred example of the coating composition which may be employed to coat the glass cloth substrate with a heat and wear-resistant layer to be contacted by the hot glass consists of the following constituents:

| RANGE Parts by Weight | PREFERRED AMOUNT Parts by Weight | COMPONENT | CONSTITUENT |
|---|---|---|---|
| 20 to 30 | 20 Gms | (A) | Polysiloxane Glass Resin Polymer O-I Product No. T-908 Regular |
| 75 to 85 | 75 gms | (B) | Low Molecular Weight Alcohol |
| 25 to 35 | 25 gms | (C) | Finely-divided Colloidal Graphite Paste Acheson - Dag No. 154 |

The coating composition is a dispersion of a micrographite in silicone resin-alcohol solution.

The Owens-Illinois Glass Resin Polymer, Product No. T-908 Regular, Component (A), is an organopolysiloxane resin designed for high temperature laminating applications which require considerable retained flexural strength when the laminate is exposed to elevated temperatures for a prolonged period of time. The subject organopolysiloxane resin is produced by the cohydrolysis and co-condensation of different alkoxysilanes employing the steps of: (a) heating the reaction mixture to form a partial cendensation product, (b)

concentrating this product, (c) precuring the concentrated product, and (d) finally curing the precured product. The resins are useful as machinable, heat-resistant, thermoset bodies, or as coatings. The subject resin and process of making same are disclosed and claimed by U.S. Pat. No. 3,389,121 to Burzynski and Martin, issued June 18, 1968, assigned to the same common assignee as the present invention.

The following properties are typical of flake prepared from Owens-Illinois Glass Resin No. T-908 Regular:
Weight Loss to Gel: 3–4%
Weight Loss Gel to Cure: 3–4%

VISCOSITY (BROOKFIELD)

of 50% solution in xylene (w/w): 21 cps
of 40% solution in xylene (w/w): 9 cps
of 30% solution in xylene (w/w): 5–6 cps The flake resin is fully soluble in the following solvents: Benzene, xylene, tetrahydrofuran, acetone, diethyl ether, ethanol, chloroform, and ethylenedichloride.

The Product No. T-908 refers to a hardenable thermosettable organopolysiloxane resin solution (60% by weight resin solids in xylene) in which the organic groups are methyl and phenyl silicone, and wherein the ratio of this organic groups, i.e., the ratio of methyl and phenyl radicals per silicon atom (R:Si ratio) is about 1:4 and wherein the ratio of methyl and phenyl radicals on a mol basis is about 3.3:1, both of these values being based on analyses. The T-908 solid resin is soluble in other liquid silicone resins to produce liquid coating base materials.

The low molecular weight alcohol, Component (B), is a lower alcohol such as ethanol, isopropanol or butanol, with ethanol being preferred.

Dry particulate, colloidal graphite in the form of a paste is intimately combined with the organopolysiloxane resin and alcohol to form a dispersion of graphite therein. The weight ratio of the graphite to the organopolysiloxane resin solids in forming the dispersion is preferably on the order of about 1 to 0.8 to about 1 to 4. A weight ratio of about 1:4 with a weight percentage of about 4 to 7% being most beneficial. Where greater lubricity is desired in the final cured coating, a higher ratio of graphite to organopolysiloxane resin solids is used. In some cases of the aforesaid example where higher lubricity is desired, up to 25% graphite may be employed. A particularly useful graphite, Component (C), to be employed in the subject coating, consists of colloidal graphite DAG No. 154 made and sold by Acheson Colloids Company, Port Huron, Mich. Such carbon is used as a thread lubricant and consists of stable compound of resin-bonded processed micro-graphite in isopropanol.

Dag No. 154, a commercial micro-graphite paste concentrate (25 grams) is blended with a silicone resin solution containing 20 grams of O-I Product No. T-908 silicone resin in a lower alcohol such as ethanol. Dag 154 is used as the lubricant phase of the subject coating system which is formulated for coating woven glass or other high temperature fabrics comprised of ceramic, quartz, silica, carbon and the like. Micrographite is used as a lubricant because its fine particle size can more effectively coat the very fine diameter glass fibers (0.00018 inch). Glass fabrics frequently exhibit very poor abrasion resistance and must be coated to reduce friction and develop wear resistance if they are to be functional. The lubricant micro-graphite is a one-micron size graphite with a few graphite particles in the 7–10 micron range. The paste concentrate solids is less than 20 percent solids.

The silicone resin is used as a high temperature binder phase for the dispersed graphite. A low solids in alcohol solution (21 percent by weight) is used to develop a flexible coating, one which can flex under pressure to develop a vacuum seal in contact with hot glass which is at about 900° F. in temperature. The high temperature silicone resin encapsulates the glass fabric and in combination with the graphite lubricant provides a solid lubricant coated structure which is functional under repeated compression cycles in contact with hot glass articles.

A sheet of silicone rubber backing is applied over one surface of the glass fiber cloth using a silicone rubber adhesive. A preferred type of such sheeting is Grade No. 3320, having 70 durometer and a thickness of ⅛ inch, made and sold by the Connecticut Hard Rubber Company. The rubber sheeting is firmly cemented to the glass fiber cloth using an RTV silicone rubber sealer such as high temperature RTV 106 adhesive/sealant, a onecomponent system designed for extremely high temperature applications, which product is made and sold by General Electric Company. G.E. RTV 106 is a red, paste-consistency, extremely high-temperature resistant adhesive/sealant. It will flow only with external pressure, and may be applied to surfaces in thicknesses up to ¼ inch. The product is especially formulated to perform at temperatures up to 500° F. (260° C.) in continuous operation, and up to 600° F. (315° C.) for short periods, with relatively little change in physical properties. On exposure to atmospheric moisture at room temperature, such adhesive/sealant cures to a tough, durable, resilient silicone rubber. The product utilizes an acetoxy cure system, releasing small amounts of acetic acid vapors from the sealant surface during curing.

The above-described coating composition is then applied over the fibrous substrate in the form of a continuous imperforate layer by various techniques such as brushing, or spraying. Preferably, a single-layer coating is applied over the substrate to obtain a full impregnation of the fabric. The coating layer on the substrate is cured by heating in an air-circulating oven for about one hour at 500° F. to 600° F. (260° C. to 315° C.) with the higher limit being preferred. Following such curing, the coating is very adherent to the substrate and fully penetrates the pores and interstices of the fabric. In the case where organic processing aids are used on the fabric, or on the yarn or roving for making the fabric, the organic coating on the fibers of the fabric from their manufacture must be burned off prior to the coating as aforesaid. The fabric exhibits a relatively-greater stiffness when coated, and the coating is cured on heating to a hardened thermoset condition.

The woven fabric can be cut to shape, assembled and coated, or a coated fabric can be cut to shape and assembled. After the fabric is bonded to the silicone rubber backing, and becomes a laminated structure, the pad is flexed by pulling the silicone rubber side over a 90° bench top corner to work the coated fabric and soften the weave. The coated fabric must be flexed, as stated, such as by bending it sharply in two directions over the sharp corner, or by passing the coated fabric between a pair of rollers to achieve such breaking of the coating. The fabric then possesses the property of being generally flexible for use as a vacuum pad, and the like. The term "generally flexible" as used herein refers to a coated fabric substrate which is sufficiently flexible for conveyor facing or belting applicable to continuous operation around a pair of six-inch pulleys.

The vacuum pad 10 is shown in FIG. 1 of the drawings having a circular configuration. The fibrous substrate of glass fiber cloth 11 has a lesser diameter than the silicone rubber backing member 12 to permit clamping of the pad into its holder. The rubber backing member 12 is affixed to the glass fiber cloth 11 by a layer of silicone rubber sealant/adhesive 13. Both the fiber cloth 11 and silicone rubber backing member have a central aperture cut therein for vacuum application.

The coated fabric having the silicone rubber backing is usually attached to a rigid base plate such as a round cast steel plate used for handling newly-formed glassware. The coated fabric on the base plate in the form of a vacuum pad serves to protect the hot glassware against defects. The vacuum pad having a central aperture for pulling the vacuum provides long-term life to the vacuum holder for its uniform operation. The top coating on the fabric provides good lubricity with low friction and excellent heat-resistance for repeated direct contact with hot glass. The vacuum pad is able to support hot glass articles without marring or marking of the glass surfaces, and without any pick-up of residue which might deleteriously affect the appearance or structural strength of the articles. The coating is fully cured into solidified thermoset condition and has no tackiness to detract from its usefulness over a wide range of high-temperature applications. The polysiloxane resin and carbonaceous filler constituents of the coating on curing are essentially solventless and do not emit vaporized solvents or create any other emissions on use.

The method may be practiced as follows: The coated glass fiber cloth having a thickness of less than about 0.25 inch is cut into a circular pad or disk having a diameter ranging from about 4 to 8 inches. A central aperture having a diameter of less than about 0.5 inch is die cut in the center of the disk to facilitate the vacuum connection. The silicone rubber sheet is also cut to slightly greater size with a like aperture, the slightly greater dimension permitting retention of the pad in its holder. The rubber sheet is bonded to one surface of the glass fiber cloth disk using the silicone rubber adhesive/sealant. The other hot glass contacting surface of the glass fiber cloth is coated with the O-I glass resin polysiloxane resin and ethyl alcohol containing the finely-divided graphite. The coating is applied, such as by brushing, in sufficient amount to fully penetrate the complete thickness of the cloth. The coating is then cured by heating within the stated range of 500° F. to 600° F. for a period of about one to two hours. The relative resulting stiffness of the laminated pad is then broken by bending the pad alternately in two directions over a sharp corner or passing the pad through a pair of breaking rollers. The pad is then ready to be attached to the rigid metal backing plate. When so attached, the pad must be able to provide a cushioning effect for the edge of the retained glassware and also hold a vacuum for retention of the hollow glass article.

Various modifications may be resorted to within the spirit and scope of the appended claims.

I claim:

1. A heat-resistant flexible laminated vacuum pad adapted to handling hot glass articles, and the like, comprising a tightly interwoven fabric substrate formed from thin glass fibers adapted to withstand temperatures up to about 1200° F., a silicone rubber backing, adhesive means securing said backing to one surface of said fabric substrate, and a continuous heat-cured coating of polysiloxane resin having a finely-divided filler of heat-resistant carbonaceous material therein extending over the other glass-contacting surface of said substrate to form a laminated pad, said laminated pad being flexible and adapted to hold a vacuum by flexure of said laminated pad prior to use thereof as a vacuum pad.

2. A heat-resistant flexible laminated vacuum pad in accordance with claim 1, wherein said fabric substrate has a thickness of not more than about ¼ inch.

3. A heat-resistant flexible laminated vacuum pad in accordance with claim 1, wherein said continuous heat-cured coating of polysiloxane resin consists of an imperforate layer fully penetrating the fabric substrate, said fabric substrate having at least one vacuum orifice.

4. A heat-resistant flexible laminated vacuum pad in accordance with claim 1, wherein said finely-divided filler of heat-resistant particulate carbonaceous material comprises colloidal graphite having submicron size particles.

5. A heat-resistant flexible laminated vacuum pad in accordance with claim 1, wherein said finely-divided filler of heat-resistant particulate carbonaceous material comprises graphite and microporous activated charcoal.

6. A heat-resistant flexible laminated vacuum pad in accordance with claim 1, wherein said fabric substrate is comprised of thin glass fibers having a diameter of about 0.00018 inch.

7. A heat-resistant flexible laminated vacuum pad in accordance with claim 1, wherein said coating of polysiloxane resin is comprised of methyl phenyl silicone resin dissolved in alcohol.

* * * * *